May 21, 1940.  J. A. BOYER ET AL  2,201,151

BORON CARBIDE COMPOSITION

Filed Feb. 18, 1938

INVENTORS
JOHN A. BOYER
CARL G. ROSE
BY
ATTORNEY.

Patented May 21, 1940

2,201,151

UNITED STATES PATENT OFFICE 2,201,151

BORON CARBIDE COMPOSITION

John A. Boyer, Niagara Falls, and Carl G. Rose, Lewiston, N. Y., assignors to The Carborundum Company, Niagara Falls, N. Y., a corporation of Delaware Application February 18, 1938, Serial No. 191,281

11 Claims. (Cl. 106—1)

This invention relates to abrasive or wear-resistant materials composed of hard carbides, and especially to compositions in which difficultly fusible carbides are obtained in crystalline form. The invention further relates to fusion products of difficultly fusible carbides with carbides which are more easily fused such as fusion products of boron carbide with tungsten and/or molybdenum and/or chromium carbides.

Although it has long been known that the carbides of tungsten, molybdenum and chromium are extremely hard, prior to our invention they had not been obtained in a form which was practical for use as a commercial abrasive.

These hard difficultly fusible carbides are ordinarily prepared by reduction, without the carbide passing through the liquid state, and the product is obtained in the form of extremely fine powder. In order to obtain a solid mass these particles of powder must be sintered together, and this is usually done with the addition of one or more metals. This sintering of the individual particles gives a solid mass which has neither the continuity nor the physical properties of a fused crystalline material. Fusion of these carbides is attended with extreme difficulty, since their fusion temperatures approach the temperature of the electric arc, and no container is known which will withstand the temperature necessary to produce fusion and at the same time will not introduce contaminating impurities into the melt. Moreover, in attempting to fuse the materials with an electric arc, the carbides usually pick up an excess of carbon from the arc itself.

We have found, however, that mixtures of boron carbide and one or more of the carbides of tungsten, molybdenum and chromium can be readily prepared by reduction of a mixture of the oxides of these elements in a resistance type furnace.

In attempting to reduce the oxides of these carbide forming elements in a resistance type furnace, the oxides usually do not melt, and with the reaction of the loose powder with carbon the carbide or carbides is produced not as appreciably sized crystals but as a very finely divided material. If the oxides are fluxed with boric oxide, however, it is possible to obtain appreciably sized crystals of the respective carbides in conjunction with boron carbide, which in itself is not usually an objectionable impurity since it is also an extremely hard abrasive material.

The nature of the final product obtained will depend to a considerable extent upon the temperature to which the material is heated and upon the composition of the original mix. When furnace charges comparatively high in boric oxide are used or when the resulting carbides are heated to a comparatively high temperature, it is possible to obtain a product which has been completely melted and in which the carbides have crystallized from the fused mix. With lower percentages of boric oxide in the furnace charge or with temperatures somewhat lower than those required to produce complete fusion of the reduced products, products can be obtained in which distinct crystals of the respective carbides are intermingled with boron carbide but in which the mass has not been completely melted.

The size of the crystals produced depends upon the size of the furnace used, and it is possible to obtain crystals in a resistance type furnace which are quite large. Even in a small furnace, however, the crystals are of visible size and are many times the size of the powder particles of the difficultly fusible carbides in their ordinarily produced state. These crystals can be produced in euhedral form, i. e., well developed as far as crystal faces and edges are concerned.

When the carbide mixtures are prepared in accordance with our invention, the difficultly fusible carbides occur in the mass as individual crystals instead of agglomerated particles of very fine powder. In products which have been completely fused these crystals are embedded in a hard, tough matrix which is principally boron carbide and the entire mass is therefore characterized by extreme hardness and the crystalline properties of the difficultly fusible carbides can be utilized for abrasive purposes by breaking the mass into suitably sized granules.

The accompanying drawing shows illustrative examples of the structure of products produced in accordance with our invention.

Figure 1:
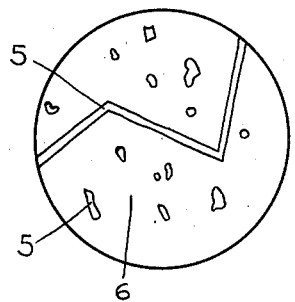
Figure 1 shows the microstructure of a boron carbide-tungsten carbide product containing approximately 30 per cent tungsten carbide.

Referring to the drawing, in Figure 1, 5 indicates crystals of tungsten carbide in a matrix 6 of a boron carbide fusion product.

Figure 2:
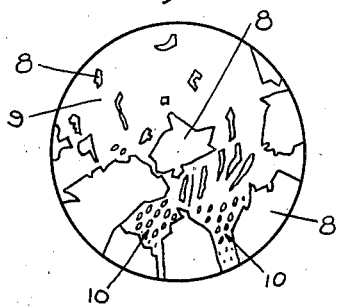
Figure 2 shows the microstructure of a boron carbide-molybdenum carbide product containing approximately 40 per cent molybdenum carbide.

In Figure 2, 8 indicates crystals of molybdenum carbide which are embedded in a matrix 9 of a boron carbide fusion product. At 10 is shown a crystalline area which has eutectic structure.

Figure 3:
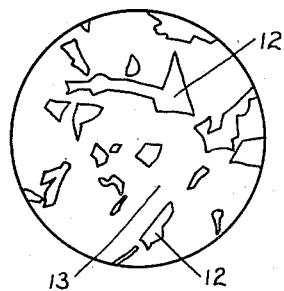
Figure 3 shows the microstructure of a boron carbide-chromium carbide product containing approximately 30 per cent chromium carbide.

In Figure 3, 12 indicates crystals of chromium carbide which are embedded in a matrix of a boron carbide fusion product, 13.

It will be noted that the microstructure of the products produced in accordance with our invention discloses definite euhedral crystals of the minor constituents. The presence of such crystals is indicative of the novel nature of their products.

In the absence of thermal curves it is impossible to state definitely whether the structure shown at 10 in Figure 2 is that of a true eutectic or of a eutectoid which results from the decomposition of a solid phase into two constituents. The two structures, as is well known, are very similar. It is sufficient for descriptive purposes, however, to state that the material has a eutectic structure and it is in this sense that the term is used in this application.

While we have illustrated, in the drawing, the microstructure of compositions containing up to approximately 40% of the added carbide our invention is not limited thereto. Compositions containing as little as about 15% of boron carbide intermingled with euhedral crystals of the added carbide and fused products containing about 85% boron carbide in which the added carbide has crystallized in a continuous matrix of boron carbide fusion product are examples of compositions within the scope of our invention.

The most practical method of producing the carbide compositions herein described is the simultaneous reduction of the respective oxides with carbon. In carrying out this process, a resistance type furnace similar to that ordinarily used for making silicon carbide or boron carbide can be employed. In furnaces of this type, a conducting core of solid carbon is buried within a loose granular mixture of the respective oxides and carbon.

A mix containing boric oxide when heated in a furnace of this type usually becomes somewhat "pasty" and the gas pressure or vaporization within the mix causes the mixture to swell out or separate from the core so that contamination with carbon is entirely prevented. The core is heated to a temperature sufficiently high to fuse at least a portion of the reduced carbide mixture surrounding it and when the charge is removed from the furnace a layer of fused material is obtained surrounding the cavity formed around the core. The mix used in the original furnace charge is approximately in the stoichiometric proportions to give the respective carbides desired in the fusion.

It has been found in the commercial manufacture of boron carbide that the addition of a volatile liquid, such as kerosene, to the mix used in charging the furnace has a desirable effect upon the operation of the furnace and such a procedure can of course be employed in the reduction of mixed oxides. The addition of kerosene seems to minimize the bloating of the mix and also facilitates the forming of "cracks" through which gases can escape.

As an alternative method for producing the fused carbide composition the mixture of oxides and carbon can be heated by means of an overhead carbon resistor, the unfused charge being used as a container for the melt. In the operation of the process in this way, since the fusion temperature of the boron carbide is so low as not to require temperatures at which carbon is very volatile, there is little or no contamination of the product caused by the carbon of the resistor. The charge must be protected, of course, from oxidation during the melting process.

We have found that somewhat denser products may be obtained by crushing the product obtained by either of the above disclosed procedures, and reheating the crushed material with a substantial proportion of a mixture such as is used for the original furnace charge.

It is well known that tungsten, molybdenum and chromium each form more than one hard carbide, and by careful regulation of the quantity of carbon in the furnace charge the particular carbide formed can be predetermined. We have found, however, that extremely careful regulation is unnecessary in many cases since all of these carbides are of such hardness as to have desirable abrasive and wear-resistant properties.

Furthermore, by regulating the composition of the furnace charge so as to have a deficiency of carbon, it is possible to produce compositions in which borides of the respective elements are present. Since these borides are likewise extremely hard, the products obtained will be of value as abrasive and wear-resistant materials. It is likewise possible, by suitable regulation, to obtain compositions in which the respective borides occur in a boron carbide matrix or in which free boron is present. It will be obvious that the composition deficient in carbon, will be free from graphite and have no tendency toward the granular fracture often caused by the presence of graphite.

As has been previously mentioned, products containing boron carbide and a mixture of carbides of tungsten and/or molybdenum and/or chromium may be produced. In such mixtures, by suitably adjusting the proportion of the ingredients, products with comparatively different characteristics may be obtained.

There are a number of other methods by which the various fusions described can be prepared, as for example, by fusion of a mixture of the respective carbides in powdered condition, and preferably in briquetted form. In this method the boron carbide having a comparatively low melting point serves as a flux for the difficultly fusible carbide or carbides.

All of the products herein described can be utilized for the manufacture of molded products by crushing or powdering the material, molding it to shape and heating the molded article to a temperature sufficient to produce either sintering or incipient fusion. Many of the products described do not have sharp melting points but melt over a considerable range of temperatures. When such materials are heated, they usually pass through a more or less pasty condition or partially fused stage before complete fluidity is reached. This property is advantageous in the making of self-bonded articles in comparison with a material which has a definite melting point at which the material passes from the solid to the liquid state without change in temperature. With materials of the "alloy" type where the incipient fusion temperature is below the temperature of complete fusion, the material can be kept in a partially fused condition for an indefinite time without further fusion taking place and much less accurate temperature control is needed to produce partial or incipient fusion without loss of shape.

A somewhat different type of article can be produced by partial fusion when one or more of the constituents is introduced in the form of grains or particles and the remaining constituents are introduced as a fine powder, for example, if tungsten carbide crystals are briquetted with finely divided boron carbide powder and the mixture heated to the point of incipient fusion, the mixture can be molded, upon application of pressure, into various shapes. Articles of this type are in reality bonded aggregates in which the difficultly fusible carbide crystals or particles are bonded with fused boron carbide or with a fused mixture or alloy of boron carbide and the difficultly fusible carbide or carbides. Compositions of this nature are very suitable for use where considerable density is required and articles made therefrom have a high degree of hardness and great wear-resistance.

This application is a continuation in part of our copending application Ser. No. 12,588 filed March 23, 1935, now Patent No. 2,108,794, issued February 22, 1938.

Having thus described our invention, we claim:

1. As a new article of manufacture a fused carbide composition consisting essentially of boron carbide and a difficultly fusible carbide of the group consisting of tungsten, molybdenum, and chromium carbides in which the difficultly fusible carbide is present as a separate crystalline phase which has solidified from a fused mass.

2. As a new manufacture a fused carbide composition consisting essentially of boron carbide and tungsten carbide in which the tungsten carbide is present as a separate crystalline phase which has solidified from a fused mass.

3. As a new manufacture a fused carbide composition consisting essentially of boron carbide and molybdenum carbide in which the molybdenum carbide is present as a separate crystalline phase which has solidified from a fused mass.

4. As a new manufacture a fused carbide composition consisting essentially of boron carbide and chromium carbide in which the chromium carbide is present as a separate crystalline phase which has solidified from a fused mass.

5. As a new manufacture a fusion of boron carbide and a difficultly fusible carbide of the group consisting of tungsten, molybdenum, and chromium carbides in which the difficultly fusible carbide occurs, at least in part, in the form of microscopic particles distributed throughout a matrix in which boron carbide is the principal constituent.

6. As a new manufacture a composition consisting of boron carbide and a difficultly fusible carbide of a metal of the group consisting of tungsten, molybdenum, and chromium carbides in which at least a part of the difficultly fusible carbide is crystallized in a form which is characteristic of a eutectic.

7. As a new manufacture a fusion of boron carbide and a difficultly fusible carbide of the group consisting of tungsten, molybdenum and chromium carbides in which the difficultly fusible carbide occurs partly in a form characterized by a eutectic structure and partly as distinct crystals, both the eutectic particles and the distinct crystals being distributed throughout a matrix which is essentially boron carbide.

8. As a new manufacture a composition resulting from high temperature reduction, consisting essentially of boron carbide and a difficultly fusible carbide of the group consisting of tungsten, molybdenum and chromium carbides in which the difficultly fusible carbide occurs as distinct crystals intermingled with a boron carbide fusion product.

9. As a new manufacture a composition resulting from high temperature reduction, consisting essentially of boron carbide and tungsten carbide in which the tungsten carbide occurs as distinct crystals intermingled with a boron carbide fusion product.

10. As a new manufacture a composition resulting from high temperature reduction, consisting essentially of boron carbide and molybdenum carbide in which the molybdenum carbide occurs as distinct crystals intermingled with a boron carbide fusion product.

11. As a new manufacture a composition resulting from high temperature reduction, consisting essentially of boron carbide and chromium carbide in which the chromium carbide occurs as distinct crystals intermingled with a boron carbide fusion product.

JOHN A. BOYER.
CARL G. ROSE.